US011891318B2

United States Patent
Wang et al.

(10) Patent No.: US 11,891,318 B2
(45) Date of Patent: Feb. 6, 2024

(54) METHOD AND APPARATUS FOR DIRECT DRYING OF INORGANIC SLUDGE WITH DRUM DRAWING PROCESS

(71) Applicant: BAOSHAN IRON & STEEL CO., LTD., Shanghai (CN)

(72) Inventors: Yingjie Wang, Shanghai (CN); Yongli Xiao, Shanghai (CN); Yongqian Li, Shanghai (CN)

(73) Assignee: BAOSHAN IRON & STEEL CO., LTD., Shanghai (CN)

(*) Notice: Subject to any disclaimer, the term of this patent is extended or adjusted under 35 U.S.C. 154(b) by 0 days.

(21) Appl. No.: 17/278,435

(22) PCT Filed: Sep. 26, 2019

(86) PCT No.: PCT/CN2019/108152
§ 371 (c)(1),
(2) Date: Mar. 22, 2021

(87) PCT Pub. No.: WO2020/063745
PCT Pub. Date: Apr. 2, 2020

(65) Prior Publication Data
US 2021/0347665 A1     Nov. 11, 2021

(30) Foreign Application Priority Data
Sep. 29, 2018 (CN) .......................... 201811145994.0

(51) Int. Cl.
*C02F 11/12* (2019.01)
*C02F 11/14* (2019.01)
(Continued)

(52) U.S. Cl.
CPC ............ *C02F 11/126* (2013.01); *B01D 47/06* (2013.01); *B01D 53/14* (2013.01); *C02F 11/143* (2019.01);
(Continued)

(58) Field of Classification Search
CPC .......... B01D 2251/30; B01D 2253/102; B01D 2258/02; B01D 47/06; B01D 53/44;
(Continued)

(56) References Cited

U.S. PATENT DOCUMENTS 3,165,268 A * 1/1965 Haussig .................... C21B 3/06
241/78
3,909,410 A * 9/1975 Neukamm .............. F26B 3/205
210/189

(Continued)

FOREIGN PATENT DOCUMENTS

CN           1743289 A      3/2006
CN         101186422 A      5/2008
(Continued)

OTHER PUBLICATIONS

Iran Office Action for the corresponding Iran application.
(Continued)

*Primary Examiner* — Joseph W Drodge
(74) *Attorney, Agent, or Firm* — Lei Fang, Esq.; Smith Tempel Blaha LLC

(57) ABSTRACT

A method and apparatus for direct drying of inorganic sludge with a drum drawing process, comprising the following steps: 1) drum mixed drying of slag and sludge: respectively conveying the slag and sludge into a drum (1) in proportion, completing mixing, heat exchange, dehydration, cooling and crushing of the slag and sludge under the rolling action of the drum (1) and a steel ball to achieve cooling, crushing and drying of the slag and sludge, and directly discharging the obtained mixture; 2) slag and sludge separation: separating the steel slag and dry sludge in a manner of combining screening and rotary separation; 3) tail gas treatment: treating dusts, sulfides and organic compounds in tail gas generated by the dry sludge by using wet alkali washing and activated carbon adsorption, and discharging the treated tail (Continued)

gas; and 4) tailing sludge treatment: generating steam and dusts in the drum treatment of the slag and sludge, allowing dusts to enter a tail gas treatment device (4) with steam, aggregating the dusts after wet washing or spraying, and then conveying into a tailing sludge blending device (5) by means of a conveying device, mixing and stirring the tailing sludge and original sludge, conveying the obtained mixture into the drum (1), and drying the mixture to realize zero discharge of undried sludge.

9 Claims, 1 Drawing Sheet

(51) Int. Cl.

| | | |
|---|---|---|
| *B01D 47/06* | (2006.01) | |
| *B01D 53/14* | (2006.01) | |
| *C21B 3/08* | (2006.01) | |
| *F26B 11/02* | (2006.01) | |
| *C02F 11/126* | (2019.01) | |
| *C02F 11/143* | (2019.01) | |
| *C02F 103/18* | (2006.01) | |

(52) U.S. Cl.
CPC .............. *C21B 3/08* (2013.01); *F26B 11/02* (2013.01); *C02F 2103/18* (2013.01); *C02F 2303/06* (2013.01); *C02F 2303/24* (2013.01); *C21B 2400/02* (2018.08)

(58) Field of Classification Search
CPC ........ B01D 53/48; B01D 53/02; B01D 53/04; B01D 53/72; B01D 53/78; B01D 53/14; B01D 53/1431; B01D 53/145; B01D 53/52; B01D 53/74; B01D 53/75; C02F 11/126; C02F 11/13; C02F 11/143; C02F 2103/16; C02F 2103/18; C02F 2303/06; C02F 2303/10; C02F 2303/24; C02F 2303/26; C02F 11/12; C21B 2400/028; C21B 2400/052; C21B 2400/056; C21B 2400/064; C21B 3/08; C21B 3/06; C21B 2100/40; C21B 2100/42; C21B 2100/44; C21B 2100/80; C21B 2400/00; C21B 2400/02; F26B 11/0472; F26B 2200/18; F26B 25/006; F26B 3/205; F26B 11/04; F26B 11/02; F26B 11/12; Y02W 10/30; Y02W 30/50
See application file for complete search history.

(56) References Cited

U.S. PATENT DOCUMENTS

| | | | |
|---|---|---|---|
| 4,747,547 A * | 5/1988 | Harada ................... | B03B 9/04 241/19 |
| 4,787,323 A | 11/1988 | Beer et al. | |
| 2003/0188603 A1 * | 10/2003 | Maki ...................... | C22B 19/30 75/484 |
| 2013/0240415 A1 * | 9/2013 | Keaton ................... | B22F 9/04 209/38 |
| 2019/0203307 A1 * | 7/2019 | Li ............................ | C21B 3/06 |

FOREIGN PATENT DOCUMENTS

| | | | |
|---|---|---|---|
| CN | 201327265 Y | | 10/2009 |
| CN | 101885574 A | | 11/2010 |
| CN | 104512988 A | * | 4/2015 |
| CN | 104512988 A | | 4/2015 |
| CN | 105731754 A | | 7/2016 |
| CN | 105731754 A | * | 7/2016 |
| CN | 109293194 A | | 2/2019 |
| JP | H0596300 A | * | 10/1995 |
| JP | 2011163648 A | | 8/2011 |
| KR | 101729994 B1 | | 4/2017 |
| KR | 101736191 B1 | * | 5/2017 |
| RU | 2293070 C2 | | 2/2007 |
| RU | 2545574 C2 | | 4/2015 |
| RU | 2666862 C1 | | 9/2018 |
| WO | 2018/000858 A1 | | 1/2018 |

OTHER PUBLICATIONS

Examination Report from the Indian Patent Office for the corresponding Indian application.
English translation of the RU Office Action for the corresponding RU application No. 2021112344/10 dated Mar. 6, 2023.
RU Office Action for the corresponding RU application No. 2021112344/10 dated Mar. 6, 2023.
Search Report from RU Patent Office for the corresponding RU application No. 2021112344/10 dated Mar. 6, 2023.
International Search Report dated Dec. 19, 2019 for PCT Patent Application No. PCT/CN2019/108152.
Written Opinion dated Dec. 19, 2019 for PCT Patent Application No. PCT/CN2019/108152.
Communication—The Extended European search report for EP App No. 19866463.3 dated Aug. 29, 2021.
Office Action from Taiwan IP Office dated Mar. 28, 2023 for corresponding pending TW application.
JP Office Action dated May 10, 2022 for JP App. No. 2021-516959.

* cited by examiner

METHOD AND APPARATUS FOR DIRECT DRYING OF INORGANIC SLUDGE WITH DRUM DRAWING PROCESS

CROSS-REFERENCE TO RELATED APPLICATIONS

This application is a 371 U.S. National Phase of PCT International Application No. PCT/CN2019/108152 filed on Sep. 26, 2019, which claims benefit and priority to Chinese patent application no. CN 201811145994.0 filed on Sep. 29, 2018, the contents of both are incorporated by reference herein in their entireties.

TECHNICAL FIELD

The present disclosure relates to the technology for treating solid waste/drying sludge, in particular to a method and an apparatus for directly drying inorganic sludge by a drum process.

BACKGROUND ART

Along with the economic development and the rapid growth of urban population, as well as the increasing treatment rate of industrial and urban sewage, the amount of sludge produced in sewage treatment plants is increasing from day to day. Due to the relatively backward sludge treatment technology, a more and more serious phenomenon is that cities are almost surrounded by sludge. Drying the sludge is a necessary link to realize the harmlessness, reduction and recycling of the sludge. After the sludge from a sewage treatment plant is mechanically dewatered, its water content is generally between 75% and 85%. If the water content of the sludge is to be reduced to 20% or less, the conventional sludge drying technology usually employs electric heating or steam heating which consumes a lot of energy, leading to high cost of sludge drying.

Among the existing sludge drying technologies, CN200510048978.6 utilizes the waste heat from a boiler; CN200510049554.1 and CN200510049556.0 utilize the waste heat of the flue gas from a power plant; and CN200410052759.0 discloses a backflow type temperature-controlled sludge drying device and a method, wherein dried sludge having a particle size of greater than 4 mm flows back and mixes with wet sludge, and the sludge is cut into smaller pieces with a steel wire mesh and then enters a rotary kiln, thereby increasing the efficiency of subsequent hot air drying. However, this cannot be achieved if the water content of the sludge is too high. CN03155966.2 makes use of a negative pressure airtight process. While the propagating and spreading channels of various viruses generated in the sludge treatment process are cut off, leak and propagation of the polluted air and the viruses carried thereby in the system space during the movement of the system can also be avoided. However, because all the process devices are concentrated in the mobile equipment, its processing capacity must be relatively low, and continuous operations cannot be realized.

On the other hand, as a principal country in terms of steel production, the annual output of steel in our country is nearly 1 billion tons. At the same time, more than 200 million tons of steel slag is produced each year. The thermal energy contained in each ton of slag is equivalent to 60 kilograms of standard coal. Because slag is a poor heat conductor, the technology for recovering the waste heat of slag makes slow process, and a huge amount of heat is wasted.

In order to address the challenge that drying sludge in a traditional way is costly, which influences sludge treatment, while the waste heat of steel slag cannot be utilized effectively, the present disclosure proposes a process route and an implementation method for drying sludge with the use of the waste heat of metallurgical slag.

SUMMARY

An object of the present disclosure is to provide a method and an apparatus for directly drying inorganic sludge by a drum process, wherein a treatment technology involving a hot slag drum process is used to mix slag and sludge at a specific ratio, thereby addressing the two challenges of cooling and granulating slag and drying inorganic sludge in one step.

To achieve the above object, the technical solution of the present disclosure is as follows:

A method of drying inorganic sludge with Slag, comprising the following steps: mixing slag and sludge; and separating steel slag and dry sludge after a water content of the sludge is reduced to 3%-15%.

Preferably, a mixing mass ratio of the slag to the sludge is 1.5-3.

Preferably, mixing and drying are carried out in batches, by flow addition or by semi-flow addition.

Preferably, the separation of steel slag and dry sludge is fulfilled by a combination of screening and spinning. Further preferably, the steel slag and dry sludge are separated by means of screening, wherein a screen mesh number is not less than 60 meshes.

Preferably, the method further comprises a tail gas treatment step and a tail sludge treatment step. Further preferably, the tail gas treatment comprises: treating dust and sulfides existing in the tail gas generated during the drying of the sludge by means of wet alkaline washing and/or activated carbon adsorption, and then discharging the tail gas; and the tail sludge treatment comprises wet washing or sprinkling the resulting dust, collecting the dust, mixing the dust with sludge to be dried, agitating, and mixing with slag for drying treatment.

Preferably, the mixing of the slag and the sludge is performed in a drum containing steel balls.

Preferably, the method comprises: conveying the slag and the sludge to the drum containing the steel balls with corresponding conveying devices respectively; and after the water content of the sludge is reduced to 3%-15%, conveying a mixture of the steel slag and the dry sludge to a slag-sludge separation device with a slag-sludge conveying device positioned at an outlet end of the drum to separate the steel slag from the dry sludge, wherein the dust and sulfides existing in the tail gas generated during the drying of the sludge enter a tail gas treatment device from a drum outlet, and the gas is discharged after the treatment; wherein the dust separated in the tail gas treatment enters a tail sludge mixing device from a dust mud outlet of the tail gas treatment device, mixes with sludge to be dried, and is then conveyed to the drum through a mud conveying pipeline.

Preferably, the inorganic sludge has an initial water content of 70%-99%; the slag and the inorganic sludge are added by flow addition or semi-flow addition; the inorganic sludge is treated in an amount of 10 t/h-80 t/h; and the slag is treated in an amount of 30 t/h-120 t/h.

Preferably after the mixing and drying, the slag-sludge has a temperature of 100-130° C.

Preferably, a difference between the water content of the tail sludge and the water content of the inorganic sludge to be dried does not exceed ±5%.

There is further provided a method of directly drying inorganic sludge by a drum process, wherein the method comprises the following steps:

1) Mixing sludge with slag in a drum for drying wherein slag and sludge are conveyed to a drum with their respective conveying devices at a specific mass ratio, wherein the slag and the sludge are mixed, heat exchanged, dehydrated, cooled and broken under the action of rotation of the drum and rolling of steel balls, whereby the slag and the sludge are cooled and dried, followed by direct discharge;

wherein the inorganic sludge has an initial water content of 70%-99%, and a target water content of 3%-15% after drying; wherein a slag/sludge flow ratio (by mass) of the slag to the inorganic sludge is 1.5-3.0, wherein the dryable inorganic sludge has an amount of 10 t/h-80 t/h;

2) Separating the slag from the sludge wherein the steel slag and the dry sludge are separated by a combination of screening and spinning;

3) Treating tail gas wherein wet alkaline washing and activated carbon adsorption are utilized to treat dust and sulfides existing in the tail gas generated during the drying of the sludge by the drum process, and then the gas is discharged;

4) Treating tail sludge wherein steam and dust are generated after the slag and the sludge are treated in the drum, wherein the dust is carried by the steam into a tail gas treatment device, wherein the dust is wet washed or sprinkled, collected, and then conveyed to a tail sludge mixing device with a conveying device, wherein the dust is mixed with primary sludge, agitated, and then regularly conveyed to the drum with a conveying device such as a sludge pump for drying treatment, thereby achieving zero discharge of undried sludge; wherein the water content of the tail sludge after mixing and agitation should not have an unduly large difference from the initial water content of the inorganic sludge, wherein the water content difference should not exceed ±5%.

Preferably, in step 2), a screening process is used for separating the slag from the sludge, wherein the screen mesh number is not less than 60 meshes.

The apparatus for directly drying inorganic sludge by a drum process according to the present disclosure comprises: a drum containing a number of steel balls; a slag-sludge conveying device having an inlet end corresponding to an outlet of the drum; a slag-sludge separation device having an inlet end corresponding to an outlet of the slag-sludge conveying device and outlets corresponding to different stock bins; a tail gas treatment device having a gas inlet connected to the outlet of the drum through a conveying pipeline; a tail sludge mixing device having an inlet connected to a dust mud outlet of the tail gas treatment device through a conveying pipeline; a mud conveying pipeline configured to connect an outlet of the tail sludge mixing device to an inlet of the drum; and a sludge pump arranged on the mud conveying pipeline for pumping the sludge to the drum.

Preferably, the slag-sludge separation device utilizes a screening process, wherein the screen mesh number is not less than 60 meshes.

The present disclosure employs a hot slag drum process. The slag and the inorganic sludge are synchronously conveyed to the drum at a specific ratio with a slag conveying device and a sludge conveying system respectively. The slag and the sludge are fully mixed by the rotation of the drum. After the mass and heat transfer process of the slag and sludge, cold granular slag and dried sludge having the required water content are obtained. The apparatus of the present disclosure can realize rapid, steady and continuous treatment of slag granulation and sludge drying.

In the method of the present disclosure:

(1) Process of drying sludge by mixing with slag

Slag and sludge may be conveyed to a suitable container at a specific mass ratio by their respective conveying devices. An appropriate agitating device may be provided in the container to achieve full agitation and contact of the slag and the sludge. Preferably, the container itself can rotate under the driving of an external power.

Preferably, the container is a drum in which a specific number of steel balls having a specific size are contained. The slag and the sludge experience the physical processes such as mixing, heat exchange, dehydration, cooling and crushing under the action of the rotating drum and the rolling steel balls, so as to fulfill the processes of cooling and granulating the slag, and directly drying the sludge to a target water content of the sludge.

During the entire drying process, the slag and the sludge are quickly cooled and dried within a few minutes, and then discharged directly.

Generally, the mass ratio of the slag to the sludge in the container is 1.5-3. If the slag/sludge mass ratio in the container is less than 1.5, a pre-mechanical drying process must be provided on site to control the water content of OG sludge to below 40%. This will seriously affect the sludge drying efficiency, make continuous production impossible, and increase equipment investment greatly. As a result, the advantages of the process of drying sludge with a drum cannot be achieved. If the slag/sludge mass ratio exceeds 3, the temperature of the slag and sludge will be too high. If the temperature exceeds 250° C., water needs to be added to control the temperature. This will seriously affect the output of the dried sludge.

For mixing and drying, the slag and the sludge may be added in batches, by flow addition or by semi-flow addition. If the mixing and drying are carried out in a batch-wise mode, the slag and the sludge are added to the container at a mass ratio specified by the present disclosure. After the drying process, the slag-sludge mixture is poured out, and next batch of slag and sludge is subjected to mixing and drying. Flow addition means that the slag and the sludge are continuously added to the container at a specific flow rate, and the mixed and dried slag and sludge are continuously discharged from the container. Semi-flow addition means that the addition of the slag and/or the sludge is not continuous. Instead, a specific amount of the slag and/or the sludge is added at intervals according to the mixing and drying state in the container.

Generally, when the mixing and drying are carried out in a flow-addition mode, the flow rate of the slag entering the drum is 30 t/h-120 t/h, the flow rate of the dryable inorganic sludge is 10 t/h-80 t/h, and the slag/sludge flow ratio of the slag to the inorganic sludge is 1.5-3.0.

Generally, the initial water content of the inorganic sludge (not dried in any way) is 70%-99%, and the target water content after drying is 3%-15%.

(2) Process of separating slag from sludge

After cooling and drying, the slag and the sludge are fully blended together, and they need to be separated to facilitate subsequent resource utilization. Generally, the steel slag and the dried sludge are notably different in the physical properties. The main differences lie in density, particle size and the like. Therefore, the present disclosure adopts a combination of screening and spinning to separate the steel slag from the dry sludge. Since the particle sizes of the steel slag and the dry sludge differ by at least one order of magnitude, a screening process is preferably used in the present disclosure, wherein the screen mesh number is not less than 60 meshes, generally 80-100 meshes.

(3) Process for treating tail gas

The tail gas generated during drying the sludge by the drum process comprises dust, sulfides and other substances harmful to the environment. Hence, the tail gas needs green treatment before it is discharged. The tail gas treatment process includes wet alkaline washing and activated carbon adsorption to achieve green emission.

(4) Process for treating tail sludge

After the slag and sludge are treated in the drum, a large amount of steam and dust will be generated, and the dust will be carried by the steam into a tail gas treatment device. The dust is collected in the tail gas treatment device after wet washing or sprinkling, and then conveyed with a conveying device such as a sludge pump to a tail sludge mixing device where it is mixed with primary sludge and agitated. It is regularly conveyed with a conveying device such as a sludge pump to the drum where it is dried, thereby achieving zero discharge of undried sludge. The water content of the tail sludge after mixing and stirring should not have an unduly difference from that of the primary sludge, so as not to affect the efficiency of subsequent conveyance and drying of the sludge. Generally, this water content difference should not exceed ±5%.

The beneficial effects of the present disclosure include:

Compared with the existing technology for drying sludge with a tail gas heat source from a power plant, etc., the present disclosure can efficiently utilize the high heat of slag according to different requirements (target water content), and achieve rapid, steady and continuous direct drying of inorganic sludge and slag-sludge separation. This is conducive to subsequent resource utilization of the granular slag and the sludge powder, such that the added value of the dry sludge is increased. With respect to the availability of the process equipment, the present disclosure utilizes the drum technology used for treating hot steel slag. The apparatus has a simple structure and is easy to operate.

DETAILED DESCRIPTION

Figure 1:
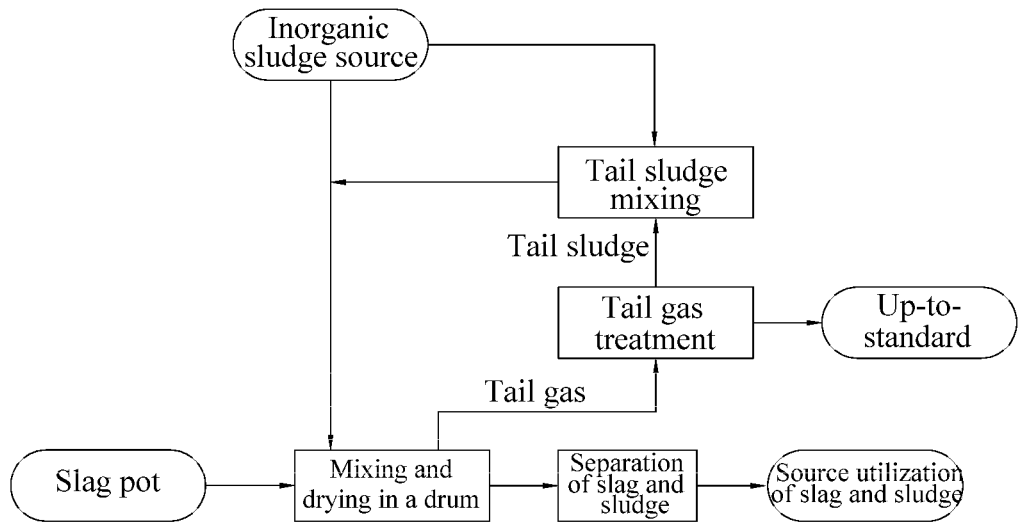
FIG. 1 is a flow chart of the process for drying inorganic sludge with a drum according to the present disclosure.

With reference to FIG. 1, the method of directly drying inorganic sludge by a drum process comprises the following steps:

1) Mixing sludge with slag in a drum for drying

Slag and sludge are conveyed to a drum with their respective conveying devices at a specific ratio, wherein the slag and the sludge are mixed, heat exchanged, dehydrated, cooled and broken under the action of rotation of the drum and rolling of steel balls, whereby the slag and the sludge are cooled and dried, followed by direct discharge. The inorganic sludge has an initial water content of 70%-99%, and a target water content of 3%-15% after drying. A slag/sludge flow ratio of the slag to the inorganic sludge is 1.5-3.0. The mass of the dryable inorganic sludge is 10 t/h-80 t/h.

2) Separating the slag from the sludge

The steel slag and the dry sludge are separated by a combination of screening and spinning.

3) Treating tail gas

Wet alkaline washing and activated carbon adsorption are utilized to treat dust, sulfides and organic compounds existing in the tail gas generated during the drying of the sludge by the drum process, and then the gas is discharged.

4) Treating tail sludge

Steam and dust are generated when the slag and the sludge are treated in the drum. The dust is carried by the steam into a tail gas treatment device where the dust is wet washed or sprinkled, then collected. Then, the dust is conveyed with a conveying device to a tail sludge mixing device where the dust is mixed with primary sludge, agitated, and then regularly, quantitatively conveyed to the drum device with a conveying device such as a sludge pump for drying treatment, thereby achieving zero discharge of undried sludge. The water content of the tail sludge after mixing and agitation should not have an unduly large difference from the water content of the primary sludge, wherein the water content difference should not exceed ±5%.

Preferably, in step 2), a screening process is used for separating the slag from the sludge, wherein the screen mesh number is not less than 60 meshes.

Figure 2:
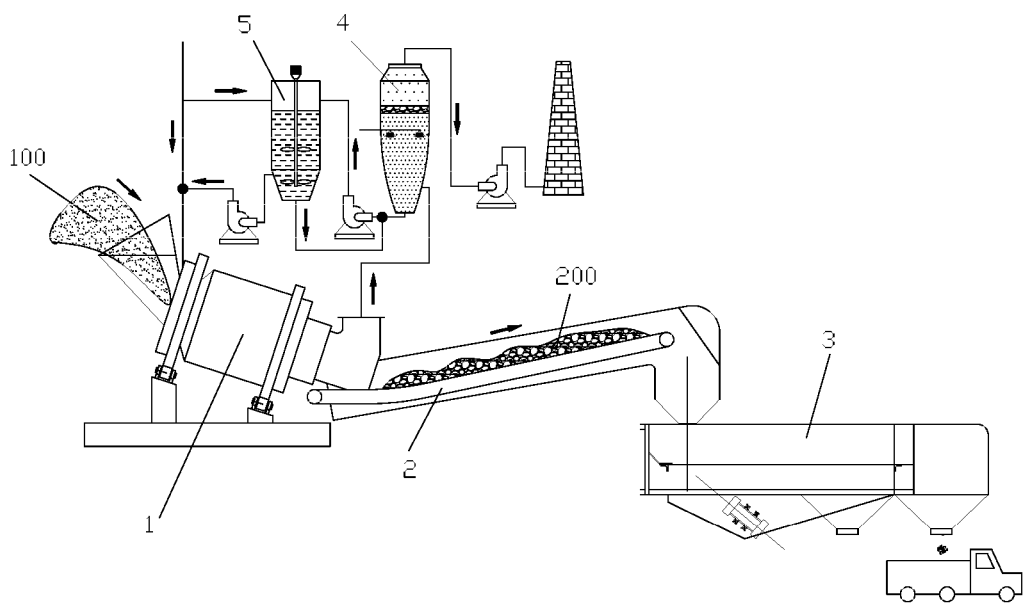
FIG. 2 is a schematic view showing the structure of the apparatus for drying inorganic sludge with a drum according to the present disclosure.

With reference to FIG. 2, the apparatus for directly drying inorganic sludge by a drum process according to the present disclosure comprises: a drum 1 containing a number of steel balls; a slag-sludge conveying device 2 having an inlet end corresponding to an outlet of the drum 1; a slag-sludge separation device 3 having an inlet end corresponding to an outlet of the slag-sludge conveying device 2 and outlets corresponding to different stock bins; a tail gas treatment device 4 having a gas inlet connected to the outlet of the drum 1 through a conveying pipeline; a tail sludge mixing device 5 having an inlet connected to a dust mud outlet of the tail gas treatment device 4 through a conveying pipeline, wherein an outlet of the tail sludge mixing device 5 is connected to an inlet of the drum 1 through a mud conveying pipeline and a sludge pump.

Preferably, the slag-sludge separation device utilizes a screening process, wherein the screen mesh number is not less than 60 meshes.

The present disclosure employs a hot slag drum treatment process. The molten slag and the inorganic sludge are synchronously conveyed to the drum at a specific ratio with a molten slag conveying device and a sludge conveying system respectively. The slag and the sludge are fully mixed by the rotation of the drum. After the mass and heat transfer process of the slag and sludge, cold granular slag and dried sludge having the required water content are obtained. The apparatus of the present disclosure can realize rapid, steady and low-cost treatment of slag granulation and sludge drying.

The working process is as follows:

Metallurgical slag 100 is first continuously conveyed to a rotating drum 1 from a slag pot. At the same time, inorganic sludge is conveyed to the drum 1 at a given flow rate with a sludge conveying device from a place where it is produced. Under the combined action of the drum body and steel balls in the drum 1, the slag and the water-containing sludge are fully mixed. After the heat and mass transfer process, the slag is granulated, and the sludge is dehydrated. Then, the sludge 200 is conveyed with a sealed slag-sludge conveying device 2 to a slag-sludge separation device 3 for treatment. The separated materials enter different stock bins according to the composition and classification. The waste gas generated during the drum drying of the sludge is purified by a tail gas treatment device 4 and discharged when it satisfies the discharge standard. The tail sludge generated in the tail gas treatment device 4 is pumped into an inlet of a tail sludge mixing device 5 with a sludge conveying pump, mixed with the mud generated from a sludge source, agitated uniformly with an agitator, and pumped with a sludge pump at a specified concentration into a mud conveying pipeline through which it is sent to the drum 1.

Example 1

According to a comprehensive treatment process for granulating steel slag and drying OG sludge with a drum in a steel mill, a single drum device treated 180,000 tons of high-temperature steel slag per year. In the process of treating the steel slag, OG sludge mud having a water content of 80% was pumped into the drum device. The water in the OG sludge mud was used to cool the high-temperature steel slag, while the sensible heat of the steel slag was used to dry the sludge. The target water content of the sludge was set to 3%. The flow ratio of the slag/sludge fed into the drum was 1.9:1.0. 95,000 tons of OG sludge could be dried every year. After rapid treatment such as drum cooling and dehydration, the slag-sludge (100-130° C.) was directly conveyed to a slag-sludge separation device with a conveying device. The sludge was dried to a water content of about 3%. The whole process only took 5 minutes. After full heat exchange in the drum, the steel slag and the dried sludge were continuously discharged from the lower part of the slag-sludge separation device. After screening and even spinning, the granular slag and the sludge powder were sent to different stock bins, waiting for trucks to be delivered to users.

Example 2

In the process of treating steel slag, OG sludge mud having a water content of 70% was pumped into a drum device. The water in the OG sludge mud was used to cool the high-temperature steel slag, while the sensible heat of the steel slag was used to dry the sludge. The target water content of the sludge was set to 15%. The flow ratio of the slag/sludge fed into the drum was 1.5:1.0. After rapid treatment such as drum cooling and dehydration, the slag-sludge (100-130° C.) was directly conveyed to a slag-sludge separation device with a conveying device. The sludge was dried to a water content of about 3%. The whole process only took 5 minutes. After full heat exchange in the drum, the steel slag and the dried sludge were continuously discharged from the lower part of the slag-sludge separation device. After screening and even spinning, the granular slag and the sludge powder were sent to different stock bins, waiting for trucks to be delivered to users.

Example 3

In the process of treating steel slag, OG sludge mud having a water content of 95% was pumped into a drum device. The water in the OG sludge mud was used to cool the high-temperature steel slag, while the sensible heat of the steel slag was used to dry the sludge. The target water content of the sludge was set to 3%. The flow ratio of the slag/sludge fed into the drum was 3.0:1.0. After rapid treatment such as drum cooling and dehydration, the slag-sludge (100-130° C.) was directly conveyed to a slag-sludge separation device with a conveying device. The sludge was dried to a water content of about 3%. The whole process only took 5 minutes. After full heat exchange in the drum, the steel slag and the dried sludge were continuously discharged from the lower part of the slag-sludge separation device. After screening and even spinning, the granular slag and the sludge powder were sent to different stock bins, waiting for trucks to be delivered to users.

Example 4

In the process of treating steel slag, a batch-wise mode was adopted for feeding, wherein OG sludge mud having a water content of 80% was pumped into a drum device. The water in the OG sludge mud was used to cool the high-temperature steel slag, while the sensible heat of the steel slag was used to dry the sludge. The target water content of the sludge was set to 3%. The mass ratio of the slag/sludge fed into the drum was 1.9:1.0. After rapid treatment such as drum cooling and dehydration, the slag-sludge (100-130° C.) was directly conveyed to a slag-sludge separation device with a conveying device. The sludge was dried to a water content of about 3%. The whole process only took 5 minutes. After full heat exchange in the drum, the steel slag and the dried sludge were continuously discharged from the lower part of the slag-sludge separation device. After screening and even spinning, the granular slag and the sludge powder were sent to different stock bins, waiting for trucks to be delivered to users.

The invention claimed is:

1. A method of drying inorganic sludge with molten slag, comprising: mixing slag and sludge; and separating steel slag and dry sludge from the mixture after a water content of the sludge is reduced to 3 wt %-15 wt %, and where the method further comprises a tail gas treatment comprising treating dust, sulfides and organic compounds existing in a tail gas generated during the water content reduction of the sludge by wet alkaline washing and/or activated carbon adsorption, and then discharging the tail gas; and
   a tail sludge treatment comprising a wet washing or sprinkling of the resulting dust, collecting the dust, mixing the dust with sludge to be dried, agitating, and mixing the dust and sludge mixture with slag for a drying treatment.

2. The method of drying inorganic sludge with molten slag according to claim 1, wherein a mixing mass ratio of the slag to the sludge is 1.5-3.

3. The method of drying inorganic sludge with molten slag according to claim 1, wherein the steel slag and the dry sludge are separated by a combination of screening and spinning.

4. The method of drying inorganic sludge with molten slag according to claim 1, wherein the slag and the sludge are mixed in a drum containing steel balls.

5. The method of drying inorganic sludge with molten slag according to claim 4, wherein the method comprises: conveying the slag and the sludge to the drum containing the steel balls with respective conveying devices; and after the water content of the sludge is reduced to 3 wt %-15 wt %, conveying a mixture of the steel slag and the dry sludge to a slag-sludge separation device with a slag-sludge conveying device positioned at an outlet end of the drum to separate the steel slag from the dry sludge, wherein dust, sulfides and organic compounds existing in a tail gas generated during the drying of the sludge enter a tail gas treatment device from a drum outlet, and the gas is discharged after the treatment; wherein the dust separated in the tail gas treatment enters a tail sludge mixing device from a dust mud outlet of the tail gas treatment device, mixes with sludge to be dried, and is then conveyed to the drum through a mud conveying pipeline.

6. The method of drying inorganic sludge with molten slag according to claim 5, wherein the slag-sludge separation device utilizes a screening process, wherein a screen mesh number is not less than 60 mesh.

7. The method of drying inorganic sludge with molten slag according to claim 1, wherein the mixing and drying steps are each carried out in batches, by flow addition or by semi-flow addition.

8. A method of drying inorganic sludge with molten slag, comprising:

1) Mixing sludge with steel slag in a drum for drying, wherein the slag and the sludge are conveyed to the drum with their respective conveying devices at a specific flow ratio; wherein the slag and the sludge are mixed, heat exchanged, dehydrated, cooled and broken by rotating the drum and rolling steel balls, whereby the slag and the sludge are cooled and dried, followed by direct discharge; wherein the mixture has an initial water content of 70 wt %-99 wt %, and a target water content of 3 wt %-15 wt % after drying; wherein a slag/sludge flow ratio of the slag to the sludge is 1.5-3.0; wherein the sludge has a flow rate of 10 t/h-80 t/h;

2) Separating the slag from the sludge,
wherein the steel slag and the dry sludge are separated by a combination of screening and spinning;

3) Treating and discharging tail gas,
wherein a wet alkaline washing and activated carbon adsorption are utilized to treat dust, sulfides and organic compounds existing in the tail gas generated from step 1); and 4) Treating tail sludge,
wherein the dust generated from step 3) is wet washed or sprinkled, collected, and then conveyed to a tail sludge mixing device with a conveying device, wherein the dust is mixed with the sludge, agitated, and then conveyed to the drum with a sludge pump for drying treatment, wherein a difference between a water content of the tail sludge after the mixing and agitation and the water content of the tail sludge before the mixing and agitation does not exceed +5 wt %.

9. The method of drying inorganic sludge with molten slag according to claim 8, wherein in step 2), a screening process is used for separating the slag from the sludge, wherein a screen mesh number is not less than 60 mesh.

* * * * *